(12) United States Patent
Stautmeister et al.

(10) Patent No.: US 8,810,778 B2
(45) Date of Patent: Aug. 19, 2014

(54) SENSOR AND METHOD FOR OPTICALLY MEASURING A DISTANCE, A POSITION, AND/OR A PROFILE

(75) Inventors: Torsten Stautmeister, Dresden-Langebruck (DE); Tobias Otto, Dresden (DE)

(73) Assignee: Micro-Epsilon Optronic GmbH, Langebrück (DE)

( * ) Notice: Subject to any disclaimer, the term of this patent is extended or adjusted under 35 U.S.C. 154(b) by 196 days.

(21) Appl. No.: 13/515,217

(22) PCT Filed: Dec. 22, 2010

(86) PCT No.: PCT/DE2010/001507
§ 371 (c)(1),
(2), (4) Date: Jun. 11, 2012

(87) PCT Pub. No.: WO2011/076187
PCT Pub. Date: Jun. 30, 2011

(65) Prior Publication Data
US 2012/0287416 A1    Nov. 15, 2012

(30) Foreign Application Priority Data
Dec. 22, 2009 (DE) .......................... 10 2009 060 442

(51) Int. Cl.
G01S 7/481 (2006.01)
G01S 17/06 (2006.01)
G01S 17/88 (2006.01)

(52) U.S. Cl.
CPC .............. *G01S 7/4814* (2013.01); *G01S 17/88* (2013.01); *G01S 17/06* (2013.01)
USPC ........... 356/3.01; 356/3.1; 356/3.15; 356/4.1; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 3,187,185 A | 6/1965 | Milnes | |
| 4,027,978 A | 6/1977 | Yamamoto et al. | |
| 2002/0149694 A1* | 10/2002 | Seo | 348/370 |

FOREIGN PATENT DOCUMENTS

| | | |
|---|---|---|
| DE | 1423606 A | 10/1968 |
| DE | 2401113 A | 7/1974 |
| DE | 10015153 A1 | 10/2001 |
| DE | 102009060442.1 | 12/2009 |
| DE | 102010055506.1 | 7/2011 |
| WO | WO 01/17264 A1 | 3/2001 |
| WO | WO 2008/068791 A1 | 6/2008 |
| WO | WO 2008/154736 A1 | 12/2008 |
| WO | WO 2011/076187 A1 | 6/2011 |

OTHER PUBLICATIONS

International Search Authority, European Patent Office, International Search Report for International Application No. PCT/DE2010/001507, dated Jun. 1, 2011, 7 pages, The Netherlands.
International Search Authority, European Patent Office, Written Opinion for International Application No. PCT/DE2010/001507, dated Jun. 1, 2011, 6 pages, The Netherlands.
Fraunhofer-Institut Lasertechnik, "Performance and Results Annual Report 2007", Bd. Annual Report 2007, pp. 1, 3, 5,121-122, 141, 158, XP002629371, URL:www.ilt.fraunhofer.de/eng/ilt/pdf/eng/JB2007-eng.pdf, Germany.
Akasaki, et al., "Shortest wavelength semiconductor laser diode", Electronics Letters, Jun. 6, 1996, pp. 1105-1106, vol. 32—No. 12, XP006005254, IEE Stevenage, Great Britain.
The International Bureau of WIPO, International Preliminary Report on Patentability for International Application No. PCT/DE2010/001507, dated Jul. 19, 2012, 9 pages, Switzerland.
Zhu, Da-Rong, et al., "Principle and Design of the Fiber-Optic Gas Temperature Sensor Based on Colorimetry," Journal of Hefei University of Technology, Jul. 29, 2006, pp. 864-867, vol. 29, No. 7, China.

* cited by examiner

*Primary Examiner* — Luke Ratcliffe
(74) *Attorney, Agent, or Firm* — Alston & Bird LLP

(57) ABSTRACT

An optical sensor for measuring at least one of a range, a position, and a profile of an object that is to be measured, the measured object emitting electromagnetic radiation due to the temperature of the object to be measured, and the sensor having a light source for illuminating the surface of the measured object and a detector for detecting the illuminating light reflected at the object to be measured, wherein with respect to the measurability even on the bodies that emit electromagnetic radiation, the light generated by the light source has a wavelength below the peak of the Planck radiation spectrum of the object that is to be measured. A corresponding method is specified.

17 Claims, No Drawings

SENSOR AND METHOD FOR OPTICALLY MEASURING A DISTANCE, A POSITION, AND/OR A PROFILE

CROSS REFERENCE TO RELATED APPLICATIONS

This application is a national stage application, filed under 35 U.S.C. §371, of International Application No. PCT/DE2010/001507, filed Dec. 22, 2010, which claims priority to German Application No. 10 2009 060 442.1, filed Dec. 22, 2009, both of which are hereby incorporated by reference in their entirety.

BACKGROUND

1. Technical Field

The invention relates to a sensor for optically measuring a range, a position and/or a profile of an object that is to be measured, the measured object emitting electromagnetic radiation due to the temperature of the object to be measured, and the sensor having a light source for illuminating the surface of the measured object and a detector for detecting the illuminating light reflected at the object to be measured. Furthermore, the invention relates to a corresponding method.

2. Description of Related Art

Optical sensors for measuring a range, a position and/or a profile of an object that is to be measured have been known for a long time from the field. A light beam—typically a laser beam—is emitted as an illuminating light beam and is reflected at an object that is to be measured. That part of the illuminating light beam that is reflected back to the sensor is measured by a detector. The measurements allow conclusions to be drawn about the position and/or the range of the measured object relative to the sensor. In the case of a point-shaped illumination of the object to be measured, a profile of the measured object can be determined by moving the sensor, guiding the light beam and/or moving the object to be measured. In the case of non-point-shaped (for example, line- or grid-shaped) illumination patterns, a profile can be determined even without movement. A simple profile measurement can be performed with some types of optical sensors without a range measurement.

A very popular type of optical range sensor is the triangulation sensor, where the light source, the measurement point illuminated on the object to be measured, and the detector form a triangle. The distance of the measured object from the sensor is determined based on the knowledge of the geometry of the triangulation sensor and the position of the light spot on the detector.

Essential for optical measurements is the condition that a sufficient intensity of the light emitted by the sensor be reflected back to the detector and that the reflected light generate a sufficiently bright measurement spot, stripe or pattern on the detector.

Optical measurement methods pose a particular problem, especially if measurements on self-luminous bodies are to be performed. One of the most important cases of self-luminous objects to be measured are hot objects. At temperatures exceeding 700° C., the bodies emit not insignificant radiation in the infrared range. As the temperature rises, the fraction of electromagnetic radiation in the visible optical range increases. If measurements on self-luminous bodies are to be performed, then the intensity of the illuminating light has to be increased for the optical sensor arrays known from the prior art, or one will have to resort to other sensor technologies, like capacitive or inductive sensors. However, one does not always want to or one cannot always dispense with the advantages of optical sensors. For example, optical sensors have, compared to other contactless sensing sensors, relatively large measurement ranges and at the same time good resolutions. Furthermore, reliable measurements can be performed on a plurality of different conductive or non-conductive materials. However, the consequence of increasing the intensity of the illuminating light is, on the one hand, an increase in the energy consumption of the sensor and, on the other hand, there is the need to observe the legally prescribed power output limit values when using lasers as the light sources, so that the power output cannot be increased in any arbitrary way.

Therefore, the object of the present invention is to configure and further develop a system and a method intended for optically measuring a range, a position and/or a profile and conforming with the type described in the introductory part in such a way that measurements can also be performed on measured objects that emit electromagnetic radiation.

SUMMARY

The invention achieves the aforementioned engineering object by means of the features disclosed in the sensor-based claim located herein. The sensor under discussion is characterized in that the light generated by the light source has a wavelength below the peak of the Planck radiation spectrum of the object that is to be measured.

With respect to the method the aforementioned engineering object is achieved by the features disclosed in the processed-based claim located herein. The method under discussion is characterized in that the object to be measured is illuminated with a light beam with a short wavelength, in order to perform the measurement, the wavelength being selected below the peak of the Planck radiation spectrum of the object that is to be measured.

DETAILED DESCRIPTION

To begin with, it has been recognized in an inventive way that there is no need to dispense with the advantages of optical measuring methods when measuring on measured objects that emit electromagnetic radiation due to the temperature of the object to be measured. Rather even in such measurement situations it is possible to perform an optical measurement by a suitable choice of the wavelength of the light beam emitted by the light source of the sensor. Each hot body emits electromagnetic radiation due to its temperature, and the spectrum of this electromagnetic radiation can be described by the Planck radiation spectrum. The Planck radiation spectrum describes the specific irradiation over the wavelength of the irradiated electromagnetic radiation. The Planck radiation spectrum is a set of curves that are dependent on the temperature of the body, and the peak, which each radiation spectrum exhibits, shifts in the direction of the shorter wavelengths as the temperature increases.

According to various embodiments of the invention, the peak of the Planck radiation spectrum is used when selecting the wavelength of the light beam that is emitted by the light source of the sensor. In most measurement situations the temperatures, with which the measured objects have to be calculated, are known. If, for example, the sensor is to be used for measuring castings in a foundry, then it is generally known how hot the measured object is in each case. Therefore, it is often the case that the wavelength, at which the peak of the Planck radiation spectrum can be expected, can be determined at an early stage. With the known peak it is also possible to perform the inventive dimensioning of the wavelength in such a way that the wavelength of the light generated by the light source is below the peak of the Planck radiation spectrum of the object to be measured. This approach satisfies the conditions for suitable means that ensure the use of the optical sensor for measuring on hot objects that are to be measured.

In various embodiments the distance between the wavelength and the peak of the Planck radiation spectrum is selected as large as possible. Depending on the temperature of the object to be measured, several 10 nm up to a few 100 nm are useful. In the case of very hot measured objects having temperatures exceeding 1,000 K, the Planck radiation spectrum declines very sharply after the peak in the direction of smaller wavelengths. In this case it is possible to select the distance between the peak of the Planck radiation spectrum and the wavelength having several 10 nm—for example, 50 nm. At lower temperatures—for example, 700 K—the Planck radiation spectrum is relatively flat, and the curve drops relatively slowly after the peak in the direction of the smaller wavelengths. In such cases it is advisable to select a distance between the wavelength of the emitted light and the peak of the Planck radiation spectrum of up to a few 100 nm.

In various embodiments the detectability of the reflected fraction of the illuminating light beam is taken into account for dimensioning the distance between the wavelength of the light emitted by the sensor and the peak of the Planck radiation spectrum. In a first step the maximum power output of the light of the light source can be defined. This maximum radiation power is generally attributable to the available energy, the potential waste heat, the radiation limit values in the respective application, the costs of the respective light source and/or other boundary conditions. The distance between the wavelength of the emitted light and the peak of the Planck radiation spectrum is selected preferably in such a way that the fraction of the illuminating light beam that is reflected back to the detector of the sensor can still be detected sufficiently well. In general it is, therefore, necessary that the light beam reflected at the object to be measured draws a light spot of sufficient intensity on the detector. In this context the light spot should not be too large, and the intensity distribution on the detector should be configured in such a way that it is possible to decide the position of the light spot on the detector with an adequate degree of certainty. Corresponding dimensioning methods have been known for a long time to the person skilled in the field. Instead of increasing the illumination power, however, it is possible at this point to influence the wavelength of the illuminating light beam, in order to improve the detectability.

In various embodiments the wavelength of the light beam emitted by the light source of the sensor is selected so as to be smaller than 450 nm. At least one embodiment provides that this wavelength be selected so as to be smaller than or equal to 432 nm. It should be pointed out that this wavelength is defined herein as just the essential fraction of the radiation intensity generated by the light source. The light source can also emit—depending on the choice of light source—other spectral fractions with longer wavelengths. Nevertheless, the peak of the radiation intensity should be at smaller wavelengths, preferably at wavelengths of less than 450 nm, even more preferably at wavelengths of less than or equal to 432 nm. Some examples of especially preferred wavelengths are 405 nm and 370 nm.

In order to protect the sensitive detector, a wavelength selective element is connected in series to the detector. As a result, the electromagnetic radiation of the object to be measured can be blocked quite well at an early stage. In this context the wavelength selective element allows in essence only the spectral fractions that contain the light of the light source to pass through. At the same time preference is given to the wavelength selective element that is designed to have narrow band characteristics, so that the light that is emitted by the light source of the sensor and that in general is designed to have equally very narrow band characteristics can be measured in a very effective way at the detector. Therefore, other spectral fractions in the reflected light beam that do not come from the light source do not lead to a general increase in the radiation intensity measured by the detector. This feature can reduce the risk of the detector becoming saturated. The wavelength selective element can be formed by an optical filter, a dispersive element or other elements known from the field.

In this context the detector can be configured in the form of a line or matrix. The detector can be designed on the basis of CMOS technology or CCD (charge coupled device) technology. The detector can also be designed as a position-dependent photodiode.

In at least one embodiment of the invention the sensor operates according to the triangulation measuring principle. In this context the distance between the object to be measured and the sensor is determined by means of the geometry of the sensor. This embodiment exploits the fact that the light source, the measurement spot illuminated on the measured object and the point illuminated on the detector form a triangle. This triangle serves to calculate the distance between the sensor and the illuminated point on the surface of the object to be measured.

In an additional embodiment of the invention the sensor operates according to the light travel principle. In this case the time required for a light beam to travel from the sensor to the measured object and back to the detector is measured. The prior art methods for measuring the runtime use the pulse runtime principle or the phase shift method. In the latter method the illuminating light beam is modulated. The runtime of the light beam induces a phase shift between the illuminating light beam and the reflected light beam. The runtime and, thus, the distance can be determined from the phase shift.

The light source is designed according to various embodiments as a laser. The laser illuminates the measured object in the form of a point, a line or a crossline. Other illumination patterns are also conceivable. Hence, a plurality of parallel lines or a plurality of crossed lines can be used for the illumination. The laser can be formed by a laser diode, a solid state laser or a gas laser.

As an alternative, the light source could also be designed as an LED (light-emitting diode). Since diodes with shorter wavelengths are becoming more available on the market, they can also be used in the sensor according to the invention. The usability depends on the respective application.

In summary some of the features of the invention are presented once again by way of example.

The invention relates to the use of a laser diode with a short wavelength (for example, 405 nm or 432 nm) at a distinct distance from the wavelength peak of a hot object radiating above 700° C.

The relation between the specific radiant emittance of a hot body and the irradiation intensity of a light source is the decisive factor for the possibility of measuring the range with respect to self-luminous surfaces due to the increase in temperature with a sensor that operates according to the triangulation measuring principle. The specific radiant emission is the emitted radiant flux divided by the area $[W/m^2]$; the irradiation intensity is the impinging radiant flux divided by the area $[W/m^2]$.

According to the Planck radiation spectrum, it follows that the larger the distance between the wavelength of the light source of the measuring unit and the peak wavelength of the self-luminous object, the lower the irradiation intensity can be, the higher the possibility of distinguishing the light point, projected on the self-luminous surface, from the self-luminous surface and, thus, of then measuring the ranges to the self-luminous surface with simultaneously light-emitting sensors that collect light by spectral selectivity. The light source emits preferably in the wavelength range of <432 nm. The use of a wavelength selective element (for example, a narrow band optical filter) in the detection channel, for example, of an interference filter, enables the radiation selection—that is, the rest of the radiation is kept away from the wide-band sensitive optoelectronic detector.

Detectors that are suitable for the range measurement according to the triangulation measuring method (point-shaped range measurement or light sectioning method) are typically CCD or CMOS lines or matrices. However, it is also possible to use position-sensitive photodiodes (PSD) for the point-shaped range measurement. In other cases a complete line or matrix camera can also be used, instead of a detector.

Light sources that can be used include laser diodes, solid state lasers or gas lasers and under some circumstances also light-emitting diodes. The beam shape is arbitrary, preferably, however, in the form of a point shape or a line shape or crossed lines.

The measuring system/the sensor can be used for the range measurement, position measurement, profile measurement. A use at objects of high temperature is possible.

Because of the wavelengths used, the penetration depth of the light into the partially transparent objects is less and, thus, also the resulting measurement errors.

The measuring system described herein operates according to the triangulation measuring principle and is used for measuring the range to bodies that emit radiation due to their temperature. The measuring system is characterized by the use of a light source (for example, a laser diode) with an emission wavelength that does not lie, according to the Planck radiation spectrum, at the peak, but rather as far away as possible from the peak of the self-radiating body.

Selection of this wavelength or more specifically suppression of diverging wavelengths in the receiving beam path by optical filters or rather dispersive elements with corresponding apertures.

With respect to additional advantageous embodiments of the device according to the invention, reference is made to the general part of the specification and the accompanying claims in order to avoid repetition.

Finally it should be explicitly pointed out that the above-described exemplary embodiments of the device according to the invention serve merely to explain the claimed teaching, but that said teaching is not limited to those exemplary embodiments.

The invention claimed is:

1. Sensor for optically measuring at least one of a range, a position, and a profile of an object that is to be measured, the measured object emitting electromagnetic radiation due to a temperature above 700° C. of the object to be measured, and the sensor having a light source for illuminating the surface of the measured object and a detector for detecting an illuminating light reflected at the object to be measured, wherein the sensor is configured to determine a Planck radiation spectrum for the measured object, and wherein the illuminating light generated by the light source has a wavelength selected for being below an identified peak of the determined Planck radiation spectrum of the object that is to be measured.

2. The sensor of claim 1, wherein a distance between the wavelength and the peak of the Planck radiation spectrum is at least a few 100 nm.

3. The sensor of claim 2, wherein the difference is approximately 10 nm.

4. The sensor of claim 1, wherein a distance between the wavelength of the light beam emitted by the light source and the wavelength peak of the object to be measured is selected large enough that at a specified maximum power output of the light of the light source a sufficient signal strength is achieved at the detector.

5. The sensor of claim 1, wherein the light beam emitted by the light source has a wavelength range of less than 450 nm.

6. The sensor of claim 5, wherein the wavelength range is less than or equal to 432 nm.

7. The sensor of claim 1, wherein a wavelength selective element is connected in series to the detector, and the wavelength selective element allows substantially only the spectral fractions that contain the light of the light source to pass through.

8. The sensor of claim 7, wherein the wavelength selective element is formed by at least one of an optical filter and a dispersive element.

9. The sensor of claim 1, wherein the detector is configured in the form of a line.

10. The sensor of claim 1, wherein the detector is configured in the form of a matrix.

11. The sensor of claim 1, wherein the detector is designed on the basis of CCD or CMOS technology.

12. The sensor of claim 1, wherein the detector is a position-dependent photodiode.

13. The sensor of claim 1, wherein the sensor is a triangulation sensor.

14. The sensor of claim 1, wherein the sensor operates according to the light travel principle.

15. The sensor of claim 1, wherein the light source is formed by a laser configured to illuminate the object to be measured, the illumination being in the form of at least one of a point, a line, and a crossline.

16. The sensor of claim 15, wherein the laser is at least one of a laser diode, a solid state laser, and a gas laser.

17. A method for optically measuring at least one of a range, a position, and a profile of an object that is to be measured, the measured object emitting electromagnetic radiation due to a temperature above 700° C. of the object to be measured, in particular using a sensor, as claimed in claim 11, wherein the object to be measured is illuminated with a light beam having a short wavelength in order to perform the measurement, the wavelength being selected below the identified peak of the determined Planck radiation spectrum of the object that is to be measured.

* * * * *